Patented Oct. 28, 1952

2,615,887

UNITED STATES PATENT OFFICE 2,615,887

REACTION PRODUCTS OF NITRILES

Ernst Zerner and Mark W. Pollock, New York, N. Y., assignors to Sun Chemical Corporation, New York, N. Y., a corporation of Delaware No Drawing. Application June 10, 1948,
Serial No. 32,263

7 Claims. (Cl. 260—248)

1

This invention relates to new organic materials.

In a copending application, Serial No. 16,135 filed March 20, 1948, there are described and claimed hexahydro-1,3,5-triacyl-s-triazine materials represented by the general formula

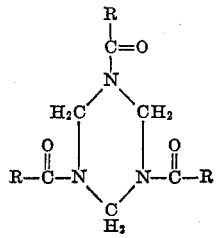

where R represents substituted or unsubstituted open chain hydrocarbon radicals. One of the materials described in the above identified copending application is hexahydro-1,3,5-triacrylyl-s-triazine. Also there is described in this copending application hexahydro - 1,3,5 - trimethacrylyl-s-triazine.

We have found according to the present invention that certain new and useful products may be obtained by proper further reactions with the latter materials.

The above derivatives of triazines contain in their molecular structure three vinyl groupings. In accordance with the present invention derivatives are secured by reactions which lead, by the formation of addition compounds to saturation of one, two or three of the vinyl groups present. Such products may be described by the formula

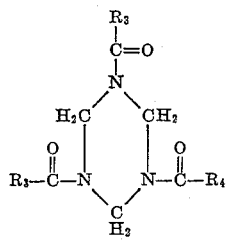

wherein $R_3$ is a radical which is selected from the group consisting of —CA=CHA where A is selected from the group consisting of hydrogen, halogen and lower alkyl radicals and addition products of —CA=CHA and where $R_4$ is an addition product of —CA=CHA.

Of these materials those which contain one or two vinyl groups present in the molecule of the products may be further treated to effect polymerization of this material, either alone or admixed with other polymerizable monomers to furnish valuable resinous materials which may be employed in various arts in which such materials find application, for instance, as coating materials for paper, wood, metal and cloth, in conjunction with drying oils, and the like.

The polymerized materials, described and claimed in a copending application Serial No. 32,264 filed on even date herewith in the names of Ernst Zerner, Marcel Gradsten, and Fred W. West may be described as polymerization products of compounds of the general formula

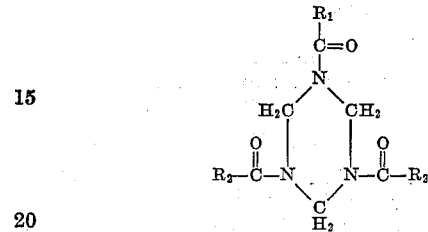

where $R_1$ represents the radical —CA=CH$_2$ wherein A is selected from the group consisting of hydrogen, halogen and lower alkyl radicals and where $R_2$ is a radical selected from the group consisting of —CA=CH$_2$ and addition products of —CA=CH$_2$.

As described in the above identified copending application Serial No. 16,135, hexahydro-1,3,5-triacrylyl-s-triazine satisfactorily may be prepared as follows: In a suitable reaction vessel provided with a stirrer, reflux condenser, thermometer and a dropping funnel are placed 265 parts by weight of acrylonitrile dissolved in 400 parts by weight of benzene, together with 2.8 parts of concentrated sulfuric acid. In the dropping funnel is placed a solution of 150 parts by weight of trioxane dissolved in 400 parts by weight of benzene. The acrylonitrile solution is warmed, satisfactorily on a boiling water bath, and the material in the dropping funnel added at a rate such that the mixture is maintained under reflux condition. When all of the solution in the dropping funnel has been added, the resulting admixture is heated under reflux conditions for an additional period of approximately three hours. Subsequently the mixture, which contains a yellow precipitate, is allowed to stand overnight and the precipitate then separated by filtration and subsequently recrystallized from ethanol.

As described in the above identified copending application, Serial No. 16,135, similar products may be obtained using as starting materials nitriles such as methacrylonitrile, alpha chloracrylonitrile and similar nitriles containing a vinyl group.

In place of the individual nitriles, mixtures of nitrile materials can be employed.

Triazines of the above type and containing three vinyl groups may be represented by the formula

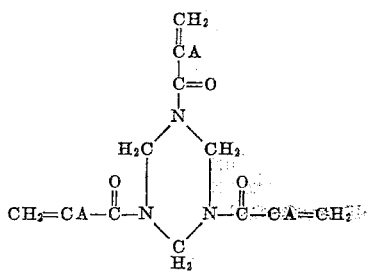

where A is hydrogen, halogen or a lower alkyl radical. Such materials may be subjected to polymerization reactions either alone or admixed with other polymerizable monomers to form valuable resinous reaction products.

Illustrative of the preparation of such polymer materials are the following examples:

*Example I*

A solution containing 6 per cent of hexahydro-1,3,5-triacrylyl-s-triazine in 20 per cent acetic acid is heated to boiling. Upon such heat treatment a polymer material is precipitated from solution and may be separated therefrom for further utilization.

In the above preparation the rate of formation of the polymer material can be increased by utilization of a peroxide in the reaction solution.

*Example II*

A 5 per cent solution of hexahydro-1,3,5-triacrylyl-s-triazine in chloroform together with 0.1 per cent of benzoyl peroxide, based on the triazine, is warmed to effect evaporation of the chloroform and subsequently heated for a period of approximately ½ hour at a temperature of 130° C. in a suitable container. A brittle white, insoluble polymer material is secured.

Polymerization of such materials may also be effected, for example, in the presence of a textile material in which case a product is obtained which comprises the textile material impregnated with the resinous product.

Also, as above set forth, copolymerization may be effected, as illustratively set forth in the following example.

*Example III*

A mixture containing 99.65 per cent by weight of styrene, 0.25 per cent by weight of hexahydro-1,3,5-triacrylyl-s-triazine and 0.1 per cent of benzoyl peroxide is heated to 60° C. to effect formation of a polymer material. The rate of polymerization is much more rapid with the triazine present than in its absence, and the product obtained is a cross linked polymer, as distinguished from linear polymers which are obtained by the polymerization of styrene. Evidence for this is the fact that the copolymerization product is insoluble in xylol, whereas polymers of styrene are soluble in such solvent.

Another aspect is the preparation of addition products of triazines of the type described above in which one, two or three of the vinyl groups present are converted into saturated groupings by suitable reaction. A variety of different materials can be employed to react with the vinyl groups present in the triazines to add thereto and to form saturated vinyl groupings. Illustrative of some of the materials which will react are compounds such as sodium bisulfite, alcohols, halogens, conjugated diolefins, amines, compounds having an active hydrogen, hydrogen sulfide and mercaptans.

Where the above illustrative materials are employed to effect reaction with triazines containing vinyl groups, either one, two or three of the vinyl groups may be saturated, depending upon the amount of reacting materials utilized. Where only one or two of the vinyl groups is thus saturated, the resulting material may be polymerized, either alone or in conjunction with other polymerizable monomers to form a resinous product, whose characteristics will be dependent in part upon the modifying reacting material employed to effect saturation of the vinyl groupings prior to polymerization, as described and claimed in the said copending application Serial No. 32,264 filed on even date herewith.

Illustrative examples setting forth this aspect include the following.

*Example IV*

20 parts by weight of hexahydro-1,3,5-triacrylyl-s-triazine is dissolved in 500 parts of water at approximately 75° C. When solution is completed there is added thereto 8.2 parts by weight of sodium bisulfite which corresponds to one molecular equivalent of sodium bisulfite per mol of triazine. Addition of the bisulfite is effected while maintaining the solution under agitation conditions. When addition of the bisulfite is completed the admixture is cooled and may be filtered to remove traces of impurities. A slightly milky solution results. Upon drying of this solution under vacuum conditions, there is obtained a clear white solid which is easily soluble in water and which does not melt or decompose at temperatures up to 250° C.

*Example V*

Aqueous solutions of the product of Example IV, upon treatment with 30 per cent hydrogen peroxide solution polymerized to give a resinous product.

*Example VI*

A 5–6 per cent solution of the product of Example IV in water, together with two drops of 30 per cent hydrogen peroxide per 100 parts by weight of solution was heated at boiling for ten minutes. The resulting solution was cooled and was employed in normal padding operation to effect impregnation of percale. After padding was completed, the impregnated percale was dried at 100° C. The treated material was remarkably stiffer than the original untreated goods, such effect being caused by the polymerization of the sodium bisulfite addition product of hexahydro-1,3,5-triacrylyl-s-triazine in situ in the fabric material.

*Example VII*

20 parts by weight of hexahydro-1,3,5-triacrylyl-s-triazine is dissolved in 500 parts of weight of water at 75° C. When solution is completed there is added, with agitation, 16.4 parts by weight of sodium bisulfite corresponding to two molecular equivalents of sodium bisulfite per mol of triazine. After addition of the bisulfite is completed, the admixture is cooled and filtered to remove impurities. Upon drying of the filtrate under vacuum condition, a clear white water-soluble product is secured which does not melt at temperatures up to 250° C.

Example VIII

Polymerization of the product of Example VII is obtained by dissolving the product in water and treating the aqueous solution with 30 per cent hydrogen peroxide.

Example IX

Hexahydro-1,3,5-triacrylyl-s-triazine is treated as described in Example VII except that there is used 24.6 parts by weight of sodium bisulfite corresponding to three molecular equivalents of sodium bisulfite per mol of triazine. A water soluble product is secured which does not undergo polymerization.

Example X 10 parts by weight of hexahydro-1,3,5-triacrylyl-s-triazine is dissolved in 200 parts of chloroform in a reaction vessel equipped with stirring device, thermometer, dropping funnel and reflux condenser. There is then added drop-wise a solution of 0.4 part by weight of metallic sodium dissolved in 12 parts of n-butanol. Upon completion of this addition the admixture is stirred for a length of time sufficient to complete the reaction, which with the quantities above described is approximately 8 hours. At the end of this reaction period the mixture is made acidic by addition of glacial acetic acid thereto. The reaction admixture is then diluted with 1½ times its volume of ether and filtered. The filtrate is evaporated to remove ether and chloroform and the residue washed with water and then dissolved in ether. The ether solution is dried, satisfactorily with sodium sulfate, and then filtered. To remove ether the admixture is distilled under reduced pressure. A brown viscous oil, the butyl alcohol addition product of hexahydro-1,3,5-triacrylyl-s-triazine is obtained.

The product, upon heating together with benzoyl peroxide, forms a resinous product.

Hexahydro-1,3,5-triacrylyl-s-triazine may be chlorinated by bubbling chlorine into the material in the presence of a small amount of a polymerization inhibitor such as hydroquinone in an amount sufficient to effect saturation of one, two or three of the vinyl groups present. The course of the reaction may be determined by the increase in weight of the reaction admixture at intervals. Where chlorination is discontinued at a point where less than all of the vinyl groups are saturated, a product is obtained which may be polymerized. Polymerization satisfactorily is effected in the presence of a peroxide polymerization catalyst.

Example XI

Hexahydro-1,3,5-triacrylyl-s-triazine may be reacted with conjugated diolefins such as butadiene in which case the reaction which occurs appears to involve the formation of a cyclic compound by a 1,4 addition of the vinyl group to the conjugated diolefin. Where less than all of the vinyl groups present are saturated, a product is obtained which may be polymerized. One satisfactory method of effecting such reaction is illustrated in a prior granted patent which shows the reaction between acrylonitrile and conjugated diolefins, namely, U. S. P. No. 2,217,632, dated October 8, 1940.

Example XII

In a suitable reaction vessel were placed 50 parts of chloroform and 12.5 parts by weight of hexahydro-1,3,5-triacrylyl-s-triazine. The mixture is warmed until solution is completed, then cooled to room temperature and there is then added thereto, in small portions, 8 parts by weight of decyl amine at a rate such that the temperature of the admixture does not rise above approximately 37° C. After addition of the amine is completed, the reaction admixture is stirred for a period of time sufficient to insure completion of the reaction which with the quantities above described is approximately 1.25 hours. The mixture then may be allowed to stand for several hours and subsequently is filtered and the chloroform removed therefrom by distillation under reduced pressure. A clear viscous liquid material is obtained.

Example XIII

Polymerization of the product of Example XII may be secured either in the presence of a peroxide oxidation catalyst or, in the absence of a catalyst, over a somewhat longer period of time. The product which is obtained by polymerization is insoluble in ordinary organic solvents indicating that the process of polymerization includes cross-linking of the polymers and that the product is not a simple linear polymer.

Example XIV

Following the procedure described in Example XII and utilizing 16 parts by weight of decyl amine there is secured an addition product in which two of the three vinyl groups of the triazines have been saturated. This product polymerizes at a rate slower than the product of Example XIII and serves satisfactorily as a plasticizing polymer to be used in conjunction with the polymer of Example XIII.

Example XV

In a reaction vessel are placed 50 parts of chloroform and 12.5 parts by weight of hexahydro-1,3,5-triacrylyl-s-triazine and there is then added thereto with stirring 3.65 parts by weight of diethyl amine dissolved in 10 parts of chloroform. After the addition has been completed, the admixture is stirred for approximately 2 hours, stirring then discontinued and the mixture allowed to stand for several hours. It then is filtered and the filtrate evaporated under reduced pressure to remove the chloroform. A white solid product is obtained which may be crystallized from ethanol to give a product which softens at 135° C. and melts at 145° C. Recrystallization of this product from toluene gives a material which softens at 146° C. and melts at 149° C.

The product of this reaction, which has only one of the vinyl groups of the triazine saturated, is polymerizable under the general conditions set forth in previous examples.

Example XVI

The procedure described in Example XV is followed except that there is used 8 parts by weight of diethyl amine to give a product which is an addition product containing two molecular equivalents of diethyl amine per mol of triazine. The product is water-soluble and is a surface active material.

Example XVII

The procedure described in Example XV is followed except that there is utilized 12 parts by weight of diethyl amine to give a reaction product containing three molecular equivalents of diethyl amine per mol of triazine.

Products in which the triazines of the present invention are reacted with materials containing an active hydrogen such as fluorene may be prepared by the utilization of alkaline condensing agents. Illustrations of such reactions involving nitrile materials are set forth in U. S. P. No. 2,280,508 of April 21, 1942.

Illustrations of reaction conditions which may be employed to effect saturation of the vinyl groups of triazines of the present invention with materials such as hydrogen sulfide are set forth in U. S. P. No. 2,163,176 dated June 20, 1939.

While the above described products constitute preferred embodiments of the invention, changes may be made therein without departing from the scope of the invention, as defined in the appended claims.

What is claimed is:

1. As new products, compounds of the formula

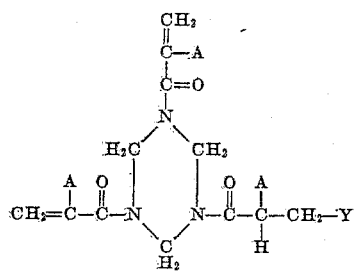

where A is selected from the group consisting of hydrogen, halogen and lower alkyl radicals, and where Y is selected from the group consisting of SO₃-alkali metal, oxy-alkyl, and amino-alkyl radicals.

2. As a new product, a compound of the formula

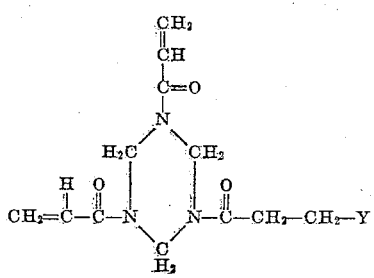

where Y represents an amino-alkyl radical.

3. As a new product, a compound of the formula

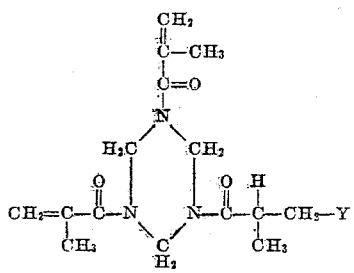

where Y represents an amino-alkyl radical.

4. As a new product, a compound of the formula

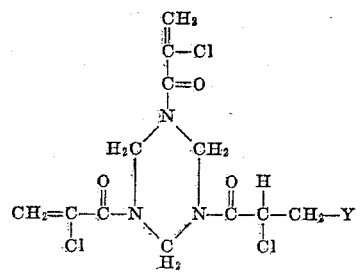

where Y represents an amino-alkyl radical.

5. As a new product, a compound of the formula

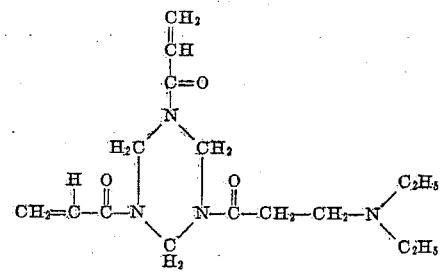

6. As a new product, a compound of the formula

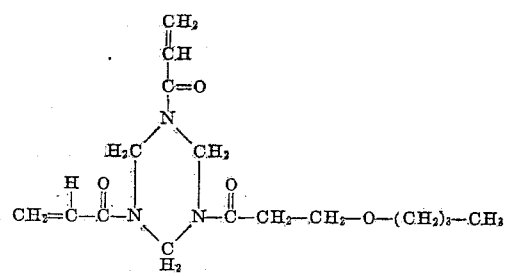

7. As a new product, a compound of the formula

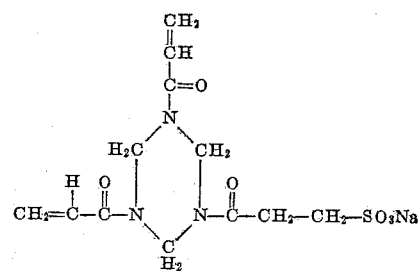

ERNST ZERNER.
MARK W. POLLOCK.

REFERENCES CITED

The following references are of record in the file of this patent:

UNITED STATES PATENTS

| Number | Name | Date |
|---|---|---|
| 1,989,042 | Kimz | Jan. 22, 1935 |
| 2,115,550 | Ellis | Apr. 26, 1938 |
| 2,304,624 | Burke | Dec. 8, 1942 |
| 2,321,989 | Burke | June 15, 1945 |